United States Patent
Ganesan et al.

(10) Patent No.: US 7,905,393 B2
(45) Date of Patent: Mar. 15, 2011

(54) GENERATING AN OPTIMIZED SUPPLIER ALLOCATION PLAN

(75) Inventors: Vijay Krishnan Ganesan, Sunnyvale, CA (US); Jian Yang, San Jose, CA (US); Gayle Lynne Hayes, Cupertino, CA (US); Mark Richard Miller, Palo Alto, CA (US)

(73) Assignee: i2 Technologies US, Inc., Dallas, TX (US)

( * ) Notice: Subject to any disclaimer, the term of this patent is extended or adjusted under 35 U.S.C. 154(b) by 672 days.

(21) Appl. No.: 11/876,941

(22) Filed: Oct. 23, 2007

(65) Prior Publication Data

US 2008/0059333 A1    Mar. 6, 2008

Related U.S. Application Data

(63) Continuation of application No. 10/090,342, filed on Mar. 1, 2002, now Pat. No. 7,343,311.

(51) Int. Cl.
*G06F 7/00* (2006.01)

(52) U.S. Cl. .............. 235/376; 705/8; 705/10
(58) Field of Classification Search .......... 235/376; 705/7, 8, 10, 28
See application file for complete search history.

(56) References Cited

U.S. PATENT DOCUMENTS

| | | | |
|---|---|---|---|
| 5,265,006 A * | 11/1993 | Asthana et al. | 705/8 |
| 6,148,291 A * | 11/2000 | Radican | 705/28 |
| 6,751,597 B1 | 6/2004 | Brodsky et al. | |
| 6,999,565 B1 * | 2/2006 | Delaney et al. | 379/88.13 |
| 7,110,976 B2 * | 9/2006 | Heimermann et al. | 705/37 |
| 2002/0156663 A1 | 10/2002 | Weber et al. | |
| 2003/0149613 A1 | 8/2003 | Cohen et al. | |
| 2004/0230413 A1 | 11/2004 | Chen | |
| 2006/0255137 A1 * | 11/2006 | Wagner et al. | 235/385 |

OTHER PUBLICATIONS

Deb, Kalyanmoy. "Multi-Objective Optimization Using Evolutionary Algorithms", 2001, John Wiley and Sons.

* cited by examiner

*Primary Examiner* — Andrew Joseph Rudy
(74) *Attorney, Agent, or Firm* — Booth Udall, PLC; Steven J. Laureanti

(57) ABSTRACT

Generating an optimized supplier allocation plan includes identifying parts and suppliers associated with an allocation problem, where each supplier can supply at least one part. One or more objective functions are selected. Each objective function has part variables, and each part variable represents a quantity of a part to be procured from a supplier. At least one constraint constraining at least one part variable is received. The one or more objective functions are optimized with respect to the at least one constraint to yield a value for each part variable. A quantity of each part to be procured from at least one supplier is determined according to the values to generate the optimized supplier allocation plan.

18 Claims, 2 Drawing Sheets

GENERATING AN OPTIMIZED SUPPLIER ALLOCATION PLAN

CLAIM OF PRIORITY

This application is a continuation of U.S. patent application Ser. No. 10/090,342, filed on 1 Mar. 2002 and entitled "GENERATING AN OPTIMIZED SUPPLIER ALLOCATION PLAN". now U.S. Pat. No. 7,343,311. U.S. Pat. No. 7,343,311 is commonly assigned to the assignee of the present application. The disclosure of related U.S. Pat. No. 7,343,311 is hereby incorporated by reference into the present disclosure as if fully set forth herein.

BACKGROUND

1. Technical Field of the Invention

This invention relates generally to supply chain planning and more specifically to generating an optimized supplier allocation plan.

2. Background of the Invention

Companies are often faced with the task of generating an allocation plan for procuring supplies such as parts or materials to meet a projected future demand. The plan may be required to allocate business to suppliers in a manner that optimizes an objective such as minimizing total spending. The optimization may need to conform to constraints such as business rules or contract obligations. The allocation of business may be for parts supplied by multiple suppliers to the sites of a company over many time periods. Typically, supplier allocation plans are generated manually with the help of spreadsheets. The complexity of the problem, however, makes it difficult to manually determine optimal allocations. Consequently, generating supplier allocation plans has posed challenges for companies.

SUMMARY OF THE INVENTION

In accordance with the present invention, disadvantages and problems associated with techniques for generating supplier allocation plans may be reduced or eliminated.

According to one example of the present invention, generating an optimized supplier allocation plan includes identifying parts and suppliers associated with an allocation problem, where each supplier can supply at least one part. One or more objective functions are selected. Each objective function has part variables, and each part variable represents a quantity of a part to be procured from a supplier. At least one constraint constraining at least one part variable is received. The one or more objective functions are optimized with respect to the at least one constraint to yield a value for each part variable. A quantity of each part to be procured from at least one supplier is determined according to the values to generate the optimized supplier allocation plan.

Certain examples of the invention may provide one or more technical advantages. A technical advantage of one example may be that an allocation problem is represented by a mathematical model that includes an objective function and constraints. The objective function is optimized in accordance with the constraints to determine an optimized allocation of business. Another technical advantage of one example may be that the mathematical model may take into account dimensions such as parts, sites, suppliers, and time periods in order to generate an accurate allocation solution. Another technical advantage of one example may be that one or more objective functions such as minimizing total spending costs, maximizing supplier performance, and maximizing contract compliance may be optimized, which may allow a user to consider multiple objectives. Examples of the invention may include none, some, or all of these technical advantages. One or more other technical advantages may be readily apparent to one skilled in the art from the figures, descriptions, and claims included herein.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
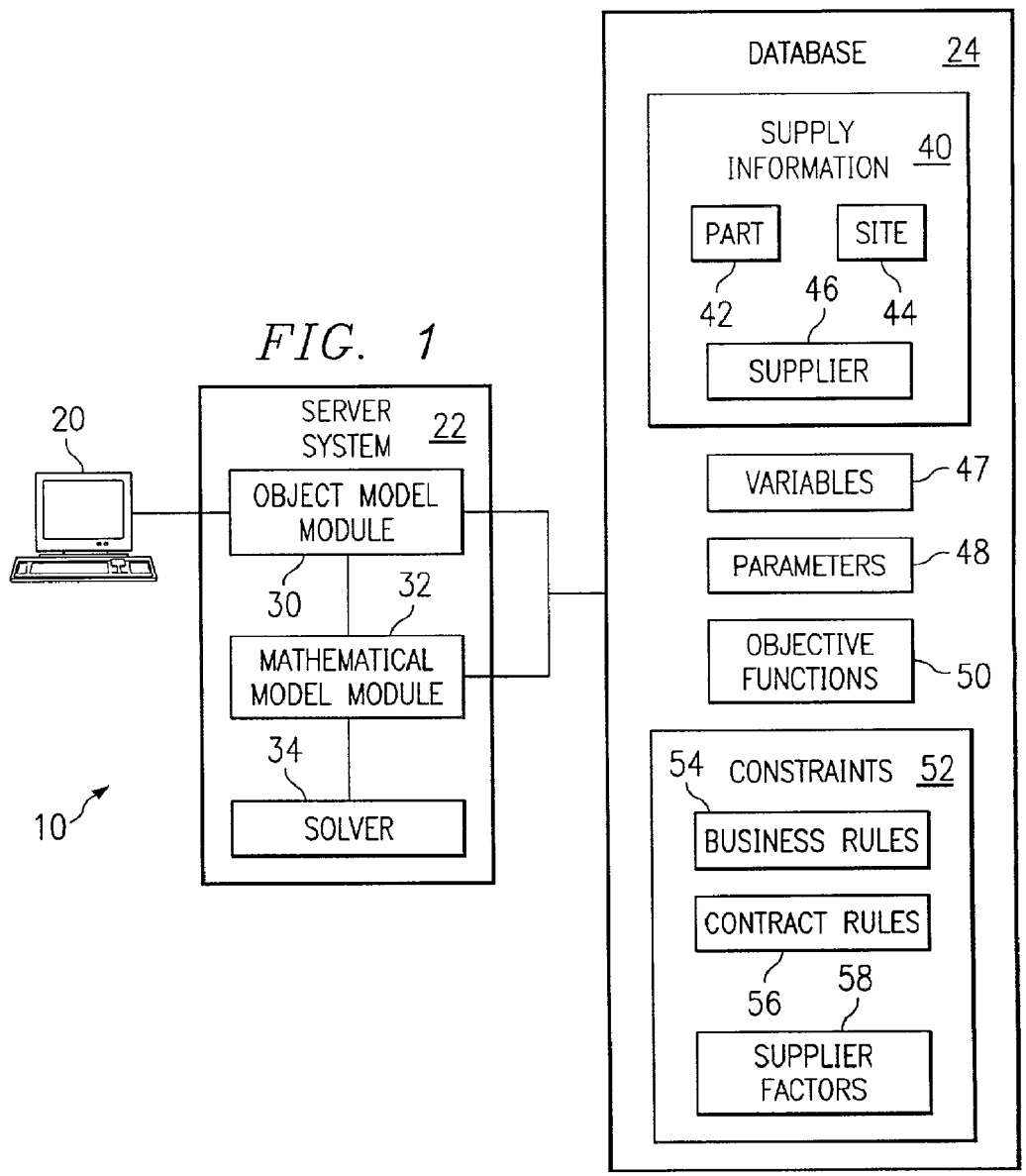
FIG. 1 illustrates an example system that generates an optimized supplier allocation plan.
Figure 2:
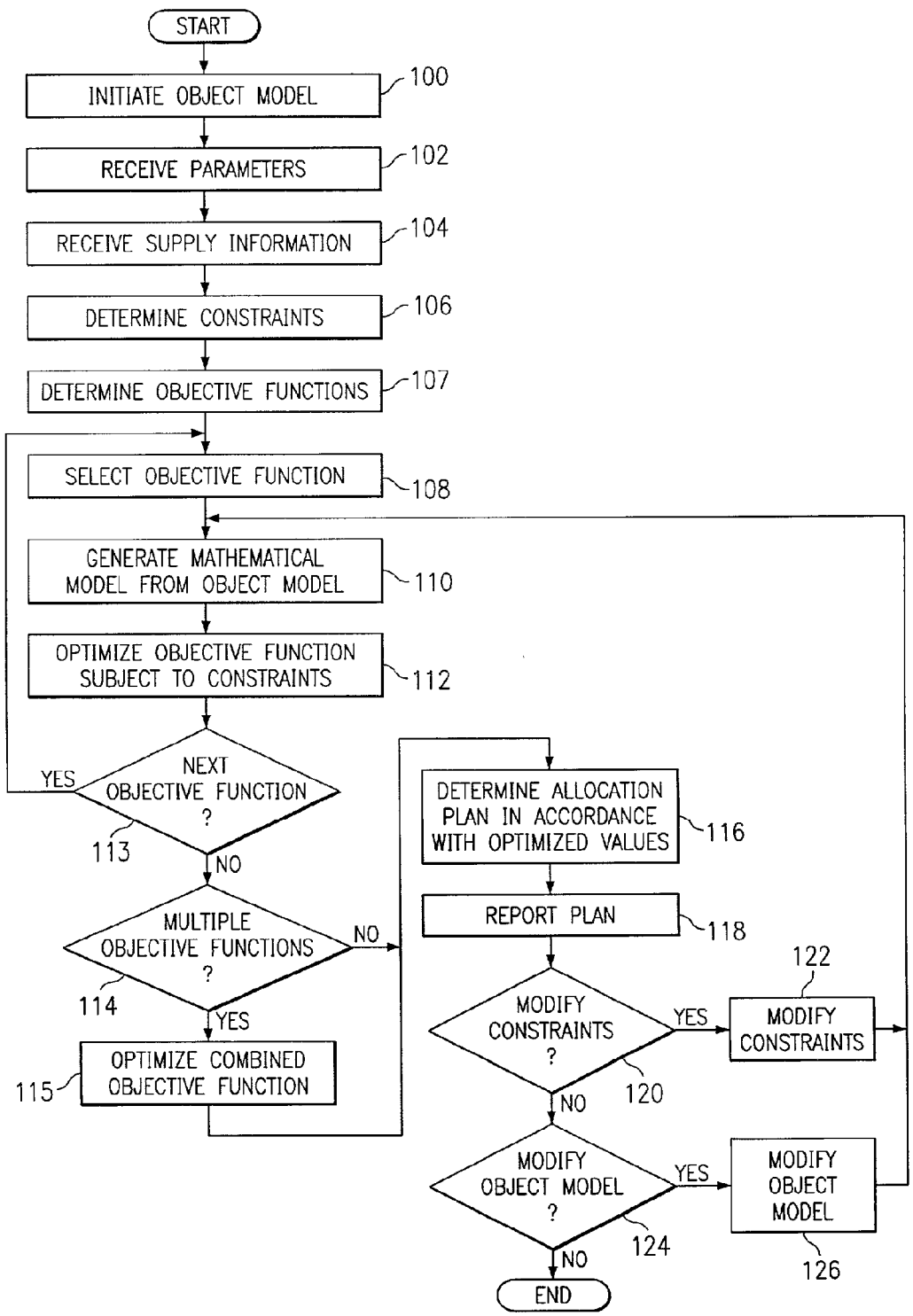
FIG. 2 illustrates an example method for generating an optimized supplier allocation plan.

Examples of the present invention and its advantages are best understood by referring to FIGS. 1 and 2 of the drawings, like numerals being used for like and corresponding parts of the various drawings.

FIG. 1 illustrates an example system 10 that generates an optimized supplier allocation plan. According to one example, the supplier allocation plan specifies quantities of supplies such as parts to be procured from suppliers for use at the sites of a company over several time periods.

In general, system 10 formulates an allocation problem as a mixed integer programming problem that can be solved using standard mathematical programming solver techniques. The allocation problem is represented as an object model that comprises collections of business objects. A mathematical model is generated from the object model. The mathematical model represents the allocation problem as an optimization problem that includes an objective function and constraints. The objective function is optimized in accordance with the constraints to determine an optimized solution.

System 10 may include a client system 20, a server system 22, and a database 24 internal or external to server system 22, each of which may operate on one or more computers at one or more locations. A computer may include appropriate input devices, output devices, mass storage media, processors, memory, or other components for receiving, processing, storing, and communicating information according to the operation of system 10. As used in this document, the term "computer" refers to any suitable device operable to accept input, process the input according to predefined rules, and produce output, for example, a personal computer, workstation, or any other suitable processing device.

Server system 22 manages applications that generate an optimized supplier allocation plan. Server system 22 may include an object model module 30, a mathematical model module 32, and a solver 34. Object model module 30 generates an object model that describes an allocation problem and can be reported by client system 20. For example, the object model may describe the parts that are needed, the sites that need the parts, the suppliers that can provide the parts, and the time periods during which the parts are needed. The object model may describe, however, any suitable feature of an allocation problem, for example, the demand for a part at a site during a time period, a maximum quantity of a part that can be ordered from a supplier for a site during a time period, or a minimum number of suppliers for a part needed at a site during a particular time period. "Parts" may refer to any suitable supply provided by a supplier, for example, materials, products, or services.

Mathematical model module 32 generates a mathematical model from the object model generated by object model module 30. A mathematical model includes one or more objective functions that represent an objective to be optimized. Objectives may include, for example, minimizing total cost. Other objectives, however, may be used, for example, maximizing supplier performance. Constraints that restrict the optimization of the objective functions may also be included. Constraints may include, for example, a demand requirement for a part at a site. Other constraints, however, may be used, for example, a maximum spending amount for a part supplied by a supplier for a site during a time period.

Solver 34 solves the mathematical model generated by mathematical model module 32 in order to yield an optimized solution to the allocation problem. Solver 34 may comprise a mathematical programming optimizer such as ILOG CPLEX by ILOG, INC., or XPRESS by DASH OPTIMIZATION, or any other suitable mathematical programming optimizer. The applications of server system 22 may comprise software, hardware, or any suitable combination of software and hardware. For example, the applications may comprise JAVA BEAN components that reside in a container such as WEBLOGIC container. The applications may have interfaces to database 24.

Database 24 includes supply information 40, variables 47, parameters 48, objective functions 50, and constraints 52. Supply information 40 includes information that may be used to set up an allocation problem, for example, part information 42, site information 44, and supplier information 46. Part information 42 describes the parts that are needed by the sites described by site information 44. The sites may include, for example, store locations. The sites, however, may include any suitable entity that may receive supplies from a supplier, such as manufacturing locations, departments of a company, or multiple companies. Supply information 46 describes the suppliers that can supply the parts to the sites.

Variables 47 include variables that are used in the mathematical model. According to one example, variables 47 include:

$x_{ijkt}$: quantity of part i from supplier j supplied to site k at period t; and $f_{ijkt}$: cost function of part i from supplier j to site k at period t.

Variable $x_{ijkt}$ may be referred to as a "part variable." The cost function may comprise a linear function or piecewise linear function. The total cost of supplying $x_{ijkt}$ is $f_{ijkt}(x_{ijkt})$.

Parameters i, j, k, and t may represent an individual entity, for example, an individual part, supplier, site, and period, respectively. The parameters, however, may represent any suitable grouping of entities. According to one example, the parameters may represent a set of entities, for example, a set of functionally equivalent parts, suppliers, sites, and periods, respectively. Parts, suppliers, and sites may be grouped into categories with priority rankings defined for each category. As used in this document, "each" refers to each member of a set or each member of a subset of the set.

Parameters 48 comprise constants that are used to formulate the allocation problem. According to one example, parameters 48 may include:

$c_{ijkt}$: unit cost of part i from supplier j to site k at period t when the cost function is linear, such that $f_{ijkt}(x_{ijkt})=c_{ijkt} x_{ijkt}$;

$d_{ikt}$: demand for part i to site k at period t;

$q_{ijkt}$: minimum quantity from supplier j for part i to site k at period t;

$Q_{ijkt}$: maximum quantity from supplier j for part i to site k at period t;

$qp_{ijkt}$: minimum quantity percentage of part i from supplier j to site k at period t;

$QP_{ijkt}$: maximum quantity percentage of part i from supplier j to site k at period t;

$s_{ijkt}$: minimum spend with supplier j for part i to site k at period t;

$S_{ijkt}$: maximum spend with supplier j for part i to site k at period t;

$sp_{ijkt}$: minimum spend percentage with supplier j for part to site k at period t;

$SP_{ijkt}$: maximum spend percentage with supplier j for part i to site k at period t;

$cs_{ijkt}$: conditional minimum spend with supplier j for part i to site k at period t;

$csp_{ijkt}$: conditional minimum spend percentage with supplier j for part i to site k at period t;

$ns_{ikt}$: minimum number of suppliers for part i to site k at period t;

$NS_{ikt}$: maximum number of suppliers for part i to site k at period t;

$m_j^c$: Boolean value indicating whether supplier j matches characteristic c or not;

$nsp_{ikt}^c$: minimum percentage of suppliers matching characteristic c for part i to site k at period t;

$NSP_{ikt}^c$: maximum percentage of suppliers matching characteristic c for part i to site k at period t;

$psp_{ikt}$: primary supplier spend percentage for part i to site k at period t;

$ssp_{ikt}$: secondary supplier spend percentage for part i to site k at period t;

$p_{ijktl}$: performance factor l of supplier j for part i to site k at period t;

$wp_l$: weight of performance factor l;

$r_{ijktl}$: risk factor l of supplier j for part i to site k at period t;

$wr_l$: weight of risk factor l;

$srb_{ijkt}$: spend to get rebate from supplier j for part i to site k at period t;

$rb_{ijkt}$: rebate from supplier j for part i to site k at period t on reaching spend of $srb_{ijkt}$;

$spn_{ijkt}$: spend to avoid penalty from supplier j for part i to site k at period t;

$pn_{ijkt}$: penalty from supplier j for part i to site k at period t if spend of $spn_{ijkt}$ is not reached;

NP: total number of parts;

NS: total number of suppliers;

NK: total number of sites;

NT: total number of periods;

NF: total number of performance factors; and

NR: total number of risk factors.

Although examples of variables 47 and parameters 48 are described, variables 47 and parameters 48 may include any variables and parameters, respectively, suitable for use in an allocation problem.

Objective functions 50 and constraints 52 are used in the mathematical model. Objective functions 50 describe an objective that is to be optimized by the supplier allocation plan. Objectives may include, for example, minimizing total cost, minimizing target supplier spend, maximizing contract compliance, maximizing supplier performance, and minimizing supplier risk. If multiple objectives are selected, they may be normalized and weighted by user specified weighting factors.

According to one example, objective functions 50 may include, for example, the following:

Minimize total spend $$\text{minimize} \sum_{i=1}^{NP} \sum_{j=1}^{NS} \sum_{k=1}^{NK} \sum_{t=1}^{NT} f_{ijkt}(x_{ijkt})$$

Rebates and penalties may be included to take into account contract compliance:

$$\text{minimize} \sum_{i=1}^{NP} \sum_{j=1}^{NS} \sum_{k=1}^{NK} \sum_{t=1}^{NT} (f_{ijkt}(x_{ijkt}) + y_{ijkt} rb_{ijkt} - z_{ijkt} pn_{ijkt})$$

subject to $$f_{ijkt}(x_{ijkt}) - srb_{ijkt} - M_{ijkt} y_{ijkt} \leq -m_{ijkt}$$

$$f_{ijkt}(x_{ijkt}) - srb_{ijkt} - M_{ijkt} y_{ijkt} \geq -M_{ijkt}$$

$$f_{ijkt}(x_{ijkt}) - spn_{ijkt} + M_{ijkt} z_{ijkt} \leq M_{ijkt}$$

$$f_{ijkt}(x_{ijkt}) - spn_{ijkt} + M_{ijkt} z_{ijkt} \geq 0$$

where $y_{ijkt}$ and $z_{ijkt}$ are binary variables, $M_{ijkt}$ is a large positive number, and $m_{ijkt}$ is a small positive number.

Minimize target supplier spend $$\text{minimize} \sum_{i=1}^{NP} \sum_{k=1}^{NK} \sum_{t=1}^{NT} f_{ijkt}(x_{ijkt}), \text{ for target supplier } j$$

The target supplier's allocations may be fixed at the optimized values resulting from the above objective, and another optimization may be performed with the objective of minimizing total spending.

Maximize target supplier spend $$\text{maximize} \sum_{i=1}^{NP} \sum_{k=1}^{NK} \sum_{t=1}^{NT} f_{ijkt}(x_{ijkt}), \text{ for target supplier } j$$

The target supplier's allocations may be fixed at the optimized values resulting from the above objective, and another optimization may be performed with the objective of minimizing total spending.

Maximize Supplier Performance $$\text{maximize} \sum_{i=1}^{NP} \sum_{j=1}^{NS} \sum_{k=1}^{NK} \sum_{t=1}^{NT} \sum_{l=1}^{NF} wp_l p_{ijktl} f_{ijkt}(x_{ijkt})$$

Minimize Supplier Risk $$\text{minimize} \sum_{i=1}^{NP} \sum_{j=1}^{NS} \sum_{k=1}^{NK} \sum_{t=1}^{NT} \sum_{l=1}^{NR} wr_l r_{ijktl} f_{ijkt}(x_{ijkt})$$

Although examples of objective functions 50 are described, objective functions 50 may include any suitable objective function that describes an objective to be optimized.

Constraints 52 restrict the optimization of objective functions 50. Constraints 52 may be automatically generated in response to supply information 40 stored in database 24, or constraints 52 may be created or modified in response to input received from client system 20. Constraints 52 may include, for example, business rules 54, contract rules 56, and supplier factors 58. Business rules 54 may include, for example:

Projected demand for each part at each site should be met for every period;

Single sourcing of parts should be avoided;

Number of suppliers getting business should not exceed specified limits;

Percentage of suppliers with certain characteristics, for example, minority owned, should be within specified limits;

Total spending or spending percentage with each supplier should be within specified limits;

Total allocation quantity or quantity percentage for each supplier should be within specified limits;

Percentage of spending with each supplier should be within specified limits;

Minimum spending or spending percentage requirements for any business with each supplier should be met;

Minimum supplier performance and risk thresholds should be met; and

Minimum spending percentages for primary and secondary suppliers should be met.

Contract rules 56 include constraints 52 that are specified by agreements. Agreements may specify, for example, contract effectiveness period, rebates, discounts, and penalties. Agreements may include descriptions of price schemes such as an order amount, order quantity, order quantity by period, simple price, step amount, step quantity, and step quantity by period.

Supplier factors 58 quantitatively describe factors about suppliers that may be taken into consideration when generating the supplier allocation plan. Supplier factors 58 may include, for example, supplier performance factors calculated from scores used to evaluate the suppliers and supplier risk factors determined from financial information about the suppliers.

According to one example, constraints 52 may include, for example, the following:

Demand Requirement. For a part, site, and time period, the total quantity from the suppliers must be greater than or equal to the demand. According to one example, demand may be exceeded, because in some cases, for example, where discounts and rebates apply, it may be cheaper to buy more than the demand.

$$\sum_{j=1}^{NS} x_{ijkt} \geq d_{ikt}$$

Minimum/Maximum Quantity Requirement. For a part, supplier, site, and time period, the quantity must be greater than or equal to a minimum quantity and less than or equal to a maximum quantity.

$$q_{ijkt} \leq x_{ijkt} \leq Q_{ijkt}$$

Minimum/Maximum Spending Requirement. For a part, supplier, site, and time period, the total spend must be greater than or equal to a minimum spend and less than or equal to a maximum spend.

$$s_{ijkt} \leq f_{ijkt}(x_{ijkt}) \leq S_{ijkt}$$

Minimum/Maximum Supplier Quantity Percentage Requirement. For a supplier, the quantity percentage of the suppliers for a part, site, and time period quantity must be greater than or equal to a minimum quantity percentage and less than or equal to a maximum quantity percentage.

$$x_{ijkt} - \frac{qp_{ijkt}}{100} \sum_{j=1}^{NS} x_{ijkt} \geq 0$$

$$x_{ijkt} - \frac{QP_{ijkt}}{100} \sum_{j=1}^{NS} x_{ijkt} \leq 0$$

Minimum/Maximum Supplier Spending Percentage Requirement. For a supplier, the spend percentage of the suppliers for a part, site, and time period must be greater than or equal to a minimum spend percentage and less than or equal to a maximum spend percentage.

$$f_{ijkt}(x_{ijkt}) - \frac{sp_{ijkt}}{100} \sum_{j=1}^{NS} f_{ijkt}(x_{ijkt}) \geq 0$$

$$f_{ijkt}(x_{ijkt}) - \frac{SP_{ijkt}}{100} \sum_{j=1}^{NS} f_{ijkt}(x_{ijkt}) \leq 0$$

Conditional Minimum Spending Requirements. For a part, supplier, site, and time period, the total spend must be either 0 or greater than or equal to a conditional minimum spend $$f_{ijkt}(x_{ijkt}) - M_{ijkt} y_{ijkt} \leq 0$$

$$f_{ijkt}(x_{ijkt}) - cs_{ijkt} y_{ijkt} \geq 0$$

where $y_{ijkt}$ is a binary variable and $M_{ijkt}$ is a large number.

Conditional Minimum Spending Percentage Requirement. For a supplier, the spend percentage of the suppliers for a part, site, and time period must be either 0 or greater than or equal to a conditional minimum spend percentage $$f_{ijkt}(x_{ijkt}) - M_{ijkt} y_{ijkt} \leq 0$$

$$f_{ijkt}(x_{ijkt}) - \frac{csp_{ijkt}}{100} \sum_{j=1}^{NS} f_{ijkt}(x_{ijkt}) - M_{ijkt} y_{ijkt} \geq -M_{ijkt}$$

where $y_{ijkt}$ is a binary variable and $M_{ijkt}$ is a large number.

Minimum/Maximum Number of Suppliers Requirement. For a part, site, and time period, the total number of suppliers must be greater than or equal to a minimum number of suppliers and less than or equal to a maximum number of suppliers $$x_{ijkt} M_{ijkt} - y_{ijkt} \leq 0$$

$$x_{ijkt} - m_{ijkt} y_{ijkt} \geq 0$$

$$ns_{ikt} \leq \sum_{j=1}^{NS} y_{ijkt} \leq NS_{ikt}$$

where $y_{ijkt}$ is a binary variable, $M_{ijkt}$ is a large number, and $m_{ijkt}$ is a small positive number.

Minimum/Maximum Percentage of Suppliers Matching Characteristics Requirement. For a part, site, and time period, the percentages of allocated suppliers matching a certain characteristic must be greater than or equal to a minimum percentage and less than or equal to a maximum percentage $$x_{ijkt} M_{ijkt} - y_{ijkt} \leq 0$$

$$x_{ijkt} - m_{ijkt} y_{ijkt} \geq 0$$

$$\frac{nsp_{ikt}^c}{100} \sum_{j=1}^{NS} y_{ijkt} \leq \sum_{j=1}^{NS} m_j^c y_{ijkt} \leq \frac{NSP_{ikt}^c}{100} \sum_{j=1}^{NS} y_{ijkt}$$

where $y_{ijkt}$ is a binary variable, $M_{ijkt}$ is a large number, and $m_{ijkt}$ is a small positive number.

Primary Supplier Allocation Requirement. For a part, site, and time period, the allocation of business to a primary supplier must be at least $psp_{ikt}$ % of the spend to all suppliers $$f_{ijkt}(x_{ijkt}) - \frac{psp_{ijkt}}{100} \sum_{j=1}^{NS} f_{ijkt}(x_{ijkt}) - M_{ijkt} y_{ijkt} \leq -m_{ijkt}$$

$$f_{ijkt}(x_{ijkt}) - \frac{psp_{ijkt}}{100} \sum_{j=1}^{NS} f_{ijkt}(x_{ijkt}) - M_{ijkt} y_{ijkt} \geq -M_{ijkt}$$

$$\sum_{j=1}^{NS} y_{ijkt} \geq 1$$

where $y_{ijkt}$ is a binary variable, $M_{ijkt}$ is a large number, and $m_{ijkt}$ is a small positive number.

Secondary Supplier Allocation Requirement. For a part, site, and time period, the allocation of business to a secondary supplier must be at least $ssp_{ikt}$ % of spend to all suppliers $$f_{ijkt}(x_{ijkt}) - \frac{ssp_{ijkt}}{100} \sum_{j=1}^{NS} f_{ijkt}(x_{ijkt}) - M_{ijkt} y_{ijkt} \leq -m_{ijkt}$$

$$f_{ijkt}(x_{ijkt}) - \frac{ssp_{ijkt}}{100} \sum_{j=1}^{NS} f_{ijkt}(x_{ijkt}) - M_{ijkt} y_{ijkt} \geq -M_{ijkt}$$

$$\sum_{j=1}^{NS} y_{ijkt} \geq 2$$

where $y_{ijkt}$ is a binary variable, $M_{ijkt}$ is a large number, and $m_{ijkt}$ is a small positive number.

Constraints 52 may be ranked in order of priority. A solution that satisfies all selected constraints 52 may be attempted. If such a solution is not possible, a solution that satisfies as many of the higher priority constraints 52 may be attempted. Although examples of constraints 52 such as business rules 54, contract rules 56, and supplier factors 58 are illustrated, constraints 52 may include any constraint suitable for constraining an objective function.

FIG. 2 is a flowchart illustrating an example method for generating an optimized supplier allocation plan. The method begins at step 100, where object model module 30 initiates an object model that describes an allocation problem. The object model may be displayed on client system 20. At steps 102 through 108, object model module 30 receives information to complete the object model. Object model module 30 receives parameters 48 describing the allocation problem at step 102. Parameters 48 may be retrieved from database 24, and may have originally been input using client system 20. Supply information 40 is received at step 104. Object model module 30 may retrieve supply information 40 from database 24, display supply information 40 on client system 20 for a user to select or modify, and receive selected or modified supply information 40 from client system 20.

Constraints are determined at step 106. Object model module 30 may retrieve constraints 52 from database 24, display constraints 52 on client system 20 for a user to select or modify, and receive selected or modified constraints 52 from client system 20. One or more objective functions 50 are determined at step 107. Object model module 30 may retrieve objective functions 50 from database 24, display objective functions 50 on client system 20 for a user select or modify, and receive selected or modified objective functions 50 from client system 20. An objective function 50 is selected to be included in the object model at step 108.

Mathematical model module 32 generates a mathematical model from the object model at step 110. Solver 34 optimizes the objective function 50 of the object model subject to constraints 52 at step 112 to yield optimized values. If there is a next objective function 50 at step 113, server system 22 returns to step 108 to select the next objective function 50. If there is no next objective function 50 at step 113, server system 22 proceeds to step 114.

Multiple objective functions may be combined and optimized to determine an optimized supplier allocation plan. If multiple objective functions are to be optimized at step 114, server system 22 proceeds to step 115 to optimize the multiple objective functions to yield optimized values. For example, a first objective function may be optimized to determine a first normalization factor, and a second objective function may be optimized to determine a second normalization factor. The first normalization factor may be used to normalize the first objective function, and the second normalization factor may be used to normalize the second objective function. The normalized first objective function and the normalized second objective function may be added together to form a combined objective function that may be optimized. According to one example, a first weighting factor may be used to weight the optimized values from the first objective function, and a second weighting factor may be used to weight the optimized values from the second objective function. The weighted first objective function and the weighted second objective function may be added together to form a combined objective function that may be optimized. If multiple objective functions are not to be optimized at step 114, server system 22 proceeds directly to step 116.

A supplier allocation plan in accordance with the optimized values at step 116. According to one example, the optimized values describe an optimized quantity of parts to be ordered from a supplier for a site at a time period. The supplier allocation plan may specify quantities of parts to be ordered from the suppliers for the sites at different time periods in accordance with the optimized values.

The optimized supplier allocation plan is reported at step 118. To report the supplier allocation plan, object model module 30 may translate the solved mathematical model to an object model that may be displayed on client system 20. Constraints 52 may be modified to determine how different constraints 52 affect resulting optimized values. If one or more constraints 52 are to be modified at step 120, constraints 52 are modified at step 122 and server system 22 returns to step 110, where mathematical model module 32 generates a mathematical model that includes the modified constraints 52. If constraints 52 are not to be modified at step 120, server system 22 proceeds to step 124.

The object model may be modified to determine optimized values for a different object model. If the object model is to be modified at step 124, server system 22 proceeds to step 126, where the object model is modified, and returns to step 110, where mathematical model module 32 generates a mathematical model from the modified object model. If the object model is not to be modified at step 124, the method ends.

Certain examples of the invention may provide one or more technical advantages. A technical advantage of one example may be that an allocation problem is represented by a mathematical model that includes an objective function 50 and constraints 52. Objective function 50 is optimized in accordance with constraints 52 to determine an optimized allocation of business. Another technical advantage of one example may be that the mathematical model may take into account dimensions such as parts, sites, suppliers, and time periods in order to generate an accurate allocation solution. Another technical advantage of one example may be that one or more objective functions 50 such as minimizing total spending costs, maximizing supplier performance, and maximizing contract compliance may be optimized, which may allow a user to consider multiple objectives.

Although an example of the invention and its advantages are described in detail, a person skilled in the art could make various alterations, additions, and omissions without departing from the spirit and scope of the present invention as defined by the appended claims.

What is claimed is:

1. A system for generating an optimized supplier allocation plan, the system comprising one or more computer systems configured to:
    initiate an object model that describes an allocation problem;
    generate a mathematical model from the object model, the mathematical model comprising multiple objective functions that represent multiple objectives to be optimized;
    optimize each of the multiple objective functions to determine a corresponding normalization factor;
    generate a combined objective function using each of the multiple objective functions normalized by the corresponding normalization factor and weighted by a corresponding weighting factor;
    receive one or more constraints that restrict the optimization of the combined objective function;
    optimize the combined objective function with respect to the one or more constraints; and
    solve the mathematical model to yield an optimized solution to the allocation problem based on the optimization of the combined objective function.

2. The system of claim 1, wherein each of the one or more objective functions comprises a plurality of part variables, each part variable representing a quantity of a part to be procured from a supplier.

3. The system of claim 2, wherein the one or more constraints constrain at least one part variable.

4. The system of claim 2, further configured to:
determine a quantity of each part to be procured from at least one supplier according to the optimized solution of the allocation problem.

5. The system of claim 1, further configured to:
determine if the combined objective function can be optimized for all of the one or more constraints; and
responsive to a determination that the combined objective function cannot be optimized for all of the one or more constraints, optimize the combined objective function for a portion of the one or more constraints.

6. The system of claim 1, further configured to:
determine if the combined objective function can be optimized for all of the one or more constraints; and
responsive to a determination that the combined objective function can be optimized for all of the one or more constraints, optimize the combined objective function.

7. A method of generating an optimized supplier allocation plan, comprising:
initiating, by a computer, an object model that describes an allocation problem;
generating, by the computer, a mathematical model from the object model, the mathematical model comprising multiple objective functions that represent multiple objectives to be optimized;
optimizing, by the computer, each of the multiple objective functions to determine a corresponding normalization factor;
generating, by the computer, a combined objective function using each of the multiple objective functions normalized by the corresponding normalization factor and weighted by a corresponding weighting factor;
receiving, by the computer, one or more constraints that restrict the optimization of the combined objective function;
optimizing, by the computer, the combined objective function with respect to the one or more constraints; and
solving, by the computer, the mathematical model to yield an optimized solution to the allocation problem based on the optimization of the combined objective function.

8. The method of claim 7, wherein each of the one or more objective functions comprises a plurality of part variables, each part variable representing a quantity of a part to be procured from a supplier.

9. The method of claim 8, wherein the one or more constraints constrain at least one part variable.

10. The method of claim 8, further comprising:
determining a quantity of each part to be procured from at least one supplier according to the optimized solution of the allocation problem.

11. The method of claim 7, further comprising:
determining if the combined objective function can be optimized for all of the one or more constraints; and
responsive to a determination that the combined objective function cannot be optimized for all of the one or more constraints, optimizing the combined objective function for a portion of the one or more constraints.

12. The method of claim 7, further comprising:
determining if the combined objective function can be optimized for all of the one or more constraints; and
responsive to a determination that the combined objective function can be optimized for all of the one or more constraints, optimizing the combined objective function.

13. A non-transitory computer-readable media embodied with software for generating an optimized supplier allocation plan, the software when executed using one or more computers is configured to:
initiate an object model that describes an allocation problem;
generate a mathematical model from the object model, the mathematical model comprising multiple objective functions that represent multiple objectives to be optimized;
optimize each of the multiple objective functions to determine a corresponding normalization factor;
generate a combined objective function using each of the multiple objective functions normalized by the corresponding normalization factor and weighted by a corresponding weighting factor;
receive one or more constraints that restrict the optimization of the combined objective function;
optimize the combined objective function with respect to the one or more constraints; and
solve the mathematical model to yield an optimized solution to the allocation problem based on the optimization of the combined objective function.

14. The computer-readable media of claim 13, wherein each of the one or more objective functions comprises a plurality of part variables, each part variable representing a quantity of a part to be procured from a supplier.

15. The computer-readable media of claim 14, wherein the one or more constraints constrain at least one part variable.

16. The computer-readable media of claim 14, wherein the software is further configured to:
determine a quantity of each part to be procured from at least one supplier according to the optimized solution of the allocation problem.

17. The computer-readable media of claim 13, wherein the software is further configured to:
determine if the combined objective function can be optimized for all of the one or more constraints; and
responsive to a determination that the combined objective function cannot be optimized for all of the one or more constraints, optimize the combined objective function for a portion of the one or more constraints.

18. The computer-readable media of claim 13, wherein the software is further configured to:
determine if the combined objective function can be optimized for all of the one or more constraints; and
responsive to a determination that the combined objective function can be optimized for all of the one or more constraints, optimize the combined objective function.

* * * * *